Jan. 1, 1952 N. J. RAKAS 2,581,203
AUTOMOBILE ARMREST
Filed Sept. 26, 1946
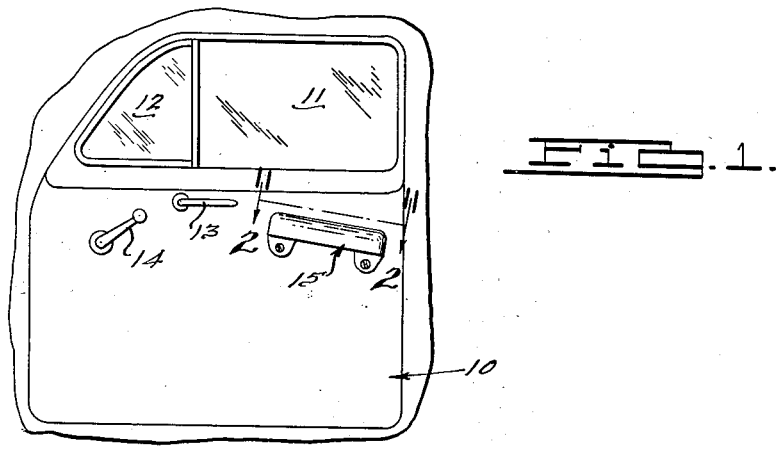
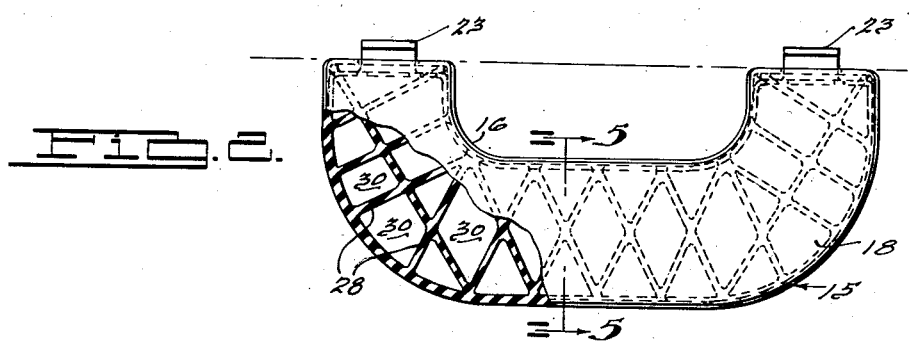
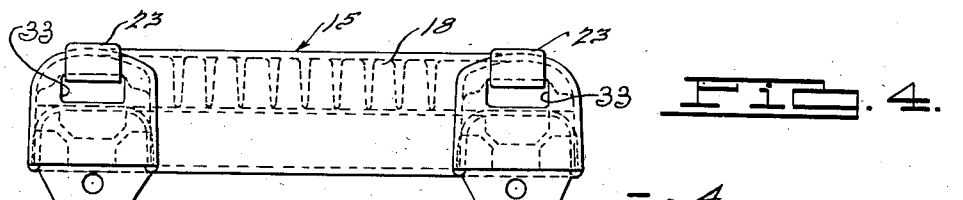
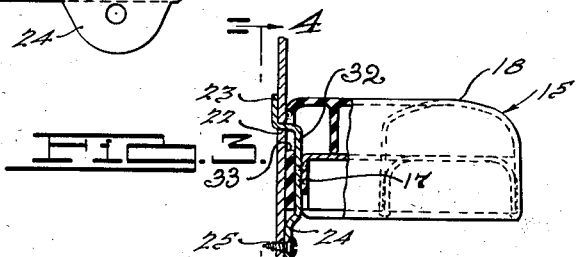
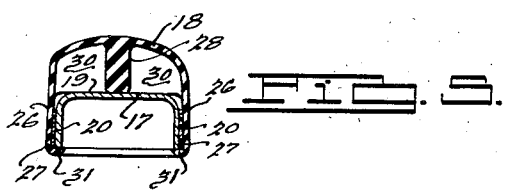
INVENTOR.
Nicholas J. Rakas.
BY
Harness and Harris
ATTORNEYS.

UNITED STATES PATENT OFFICE 2,581,203

AUTOMOBILE ARMREST

Nicholas J. Rakas, Huntington Woods, Mich., assignor to Chrysler Corporation, Highland Park, Mich., a corporation of Delaware Application September 26, 1946, Serial No. 699,482

1 Claim. (Cl. 155—198)

This invention relates to cushions and more particularly to arm rests for motor vehicles.

Heretofore arm rests for motor vehicles have customarily been fabricated by enclosing a rigid support in cloth padding, sewing a leather or cloth covering over the padding and securing the support to a door or body panel. The sewing and assembly of this type of arm rest are expensive.

It is an object of my invention to provide a novel arm rest that may be quickly assembled from a minimum of components and does not require sewing.

In the arm rest to be described herein a pad element is bonded to a supporting element and the latter secured to a door panel. The pad element produces a cushioning effect due in part to the characteristics of the material from which it is formed and in part to the shape in which it is formed. The pad element is preferably formed from natural rubber, synthetic rubber, or from flexible compounded vinyl resins. The pad element is so constructed that when it is assembled with the supporting element a plurality of air chambers are contained therein.

In addition the pad element and supporting element are adapted to be secured together by bonding to eliminate the expense of sewing.

Ornamentation of the pad may be obtained by the impregnation of colors and designs in the pad element during its manufacture. This eliminates the use of leather or cloth covering for appearance.

It is to be understood that while a vehicle arm rest is described herein as a typical application of the novel assembly that other articles of furniture or upholstering could be so fabricated.

In the drawings:

Fig. 1 is an elevation of the interior of a front door of an automotive vehicle showing the location of the arm rest to be described;

Fig. 2 is a plan view of the arm rest taken on the line 2—2 of Fig. 1 and having a portion thereof broken away;

Fig. 3 is an end view of the arm rest showing its installation on a door panel;

Fig. 4 is an elevation of the arm rest taken substantially on the line 4—4 of Fig. 3 but having the vehicle door panel removed;

Fig. 5 is a section taken on the line 5—5 of Fig. 2.

Referring to Fig. 1 a conventional vehicle door is illustrated at 10 and comprises a panel and has assembled therewith the usual windows 11 and 12 and door handle 13, window regulator 14, and arm rest 15. The construction of the arm rest 15 will be described in detail.

The arm rest 15 has a generally curved contour illustarted in Fig. 2 that is conventionally used on motor vehicles and which provides an opening 16 between the arm rest and door panel in which a passenger's hand may be inserted to use the arm rest as a door pull. The arm rest comprises an assembly of two components, namely, a support 17 and a pad element 18. The support 17 is provided with a flat upper surface 19 and depending side walls 20. In addition the support 17 has tabs 23 and 24 to facilitate the securing of the arm rest to the door 10. The interior panel 21 of the door 10 is provided with a pair of slots 22. The arm rest support is provided with a pair of upwardly extending tabs 23 which are adapted to penetrate the openings 22 and abut the inner edge of the panel 21. A pair of depending tabs 24 may be secured to the door panel 21 by screws 25 after the assembly of the tabs 23 with the door panel 21. The screws 25 take the reaction of a vertical force applied to the arm rest and the tabs 23 take the reaction of the horizontal components of moments applied to the arm rest and thereby prevent the arm rest from separating from the door panel. The tabs 23 and 24 are preferably the end portions of a pair of stampings 32 which are spot welded to the support 17. The tabs 23 penetrate openings 33 provided in the pad element 18. The term support as used herein is intended to include the tabs secured thereto.

Referring to Fig. 5, a section of the arm rest is illustrated. The pad element 18 has a generally inverted U-shape section and is adapted to receive the support 17 between its depending side walls 26 which form the legs of the U-shape section. The depending side walls 20 of the support and 26 of the pad element are adapted to be bonded together as illustrated at 27 in Fig. 5 by the use of cement or glue.

The pad element 18 is preferably formed from a flexible material such as natural rubber, synthetic rubber, or flexible compounded vinyl resins. The pad element 18 may be provided with smooth exterior surfaces and may have coloring or colored designs impregnated therein for appearance.

The pad element 18 has a depth sufficiently great so that space is provided between the upper surface 19 of support 17 and the upper surface of the pad element. A plurality of flexible depending rib elements 28 are positioned within this space and are adapted to support the upper portion of the flexible pad 18. The depending elements 28 are preferably formed as integral parts of the pad element 18. The depending elements 28 engage the upper surface 19 of the support 17 and entrap air in pockets 30. The air augments the supporting and cushioning functions performed by the depending elements 28. Referring to Fig. 2 it will be seen that in the central body portion of the pad the ribs 18 are arranged in a pattern so that the spaces 30 have a diamond shape while in the laterally extending leg portions the ribs 18 are arranged in a pattern so that substantially rectangular and triangular spaces 30 are formed therebetween.

The lower edge of the pad element 18 is preferably provided with inwardly directed extensions 31 which are adapted to engage the lower edge of the support 17 to properly position the pad element and support during assembly. The extensions 31 also serve to cover the lower edge of the depending side walls 20 of the support 17 so that a passenger's hand could not be cut by the sharp edge thereof. The extensions 31 are not necessarily limited to the shape shown and could overlap the depending side walls 20 and extend behind the side walls if desired. The extensions 31 are omitted adjacent the tabs 23 and 24 to avoid interference therewith.

It will thus be seen that the preformed pad element having the necessary coloring contained therein may be rapidly assembled with the support 17 carrying tabs 23 and 24. The element and support are bonded together by cement 27. The assembled arm rest may then be assembled with the door panel 21 as shown in Fig. 3. This construction minimizes the labor and materials involved in the manufacture and assembly of the arm rest.

I claim:

An arm rest for a motor vehicle comprising a support provided with side walls and having a body portion and terminal leg portions extending transversely therefrom, said leg portions being adapted to be secured to a vehicle panel with said body portion spaced from said panel and a resilient cushion member carried by said support and having a body portion and terminal leg portions, said resilient cushion member having a top portion, side portions which depend from the entire periphery of said top portion and ribs formed integrally with said top portion and said side portions, said ribs resting upon said support and said side portions having sufficient depth to overlap and cover all side walls of said support, the ribs in the body portion of said cushion member being arranged in a pattern to define diamond shaped spaces therebetween and the ribs in said leg portions being arranged in a different pattern to define substantially rectangular and triangular spaces therebetween.

NICHOLAS J. RAKAS.

REFERENCES CITED

The following references are of record in the file of this patent:

UNITED STATES PATENTS

| Number | Name | Date |
| --- | --- | --- |
| 1,680,509 | Ducy | Aug. 14, 1928 |
| 2,175,011 | Archer | Oct. 3, 1939 |
| 2,203,413 | Hood | June 4, 1940 |
| 2,318,841 | Dodge | May 11, 1943 |
| 2,325,292 | Westrope | July 27, 1943 |